United States Patent
Shrivastava et al.

(10) Patent No.: US 9,686,242 B2
(45) Date of Patent: Jun. 20, 2017

(54) PROTECTION OF SENSITIVE DATA OF A USER FROM BEING UTILIZED BY WEB SERVICES

(71) Applicants: Alcatel-Lucent India Limited, Gurgaon (IN); Alcatel-Lucent USA Inc., Murray Hill, NJ (US)

(72) Inventors: Nisheeth Shrivastava, Bangalore (IN); Sharad Jaiswal, Bangalore (IN); Saurabh Panjwani, Bangalore (IN); Saurabh Shukla, Sultanpur (IN); Animesh Nandi, Kolkata (IN); Thomas Woo, Short Hills, NJ (US)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 370 days.

(21) Appl. No.: 13/826,456

(22) Filed: Mar. 14, 2013

(65) Prior Publication Data

US 2014/0280870 A1    Sep. 18, 2014

(51) Int. Cl.
*G06F 15/173* (2006.01)
*H04L 29/06* (2006.01)
*H04L 29/08* (2006.01)
*H04W 4/02* (2009.01)

(52) U.S. Cl.
CPC .......... *H04L 63/0421* (2013.01); *H04L 67/22* (2013.01); *H04W 4/028* (2013.01)

(58) Field of Classification Search
CPC ..... H04L 63/0421; H04L 67/22; H04W 4/028
See application file for complete search history.

(56) References Cited

U.S. PATENT DOCUMENTS

| | | | |
|---|---|---|---|
| 7,162,494 B2* | 1/2007 | Arellano | |
| 8,635,691 B2* | 1/2014 | Vogel | G06F 21/6245 726/22 |
| 8,656,482 B1* | 2/2014 | Tosa | H04L 63/08 713/153 |
| 8,856,869 B1* | 10/2014 | Brinskelle | 726/2 |
| 2001/0021914 A1* | 9/2001 | Jacobi et al. | 705/8 |
| 2002/0198882 A1* | 12/2002 | Linden et al. | 707/10 |
| 2003/0018707 A1* | 1/2003 | Flocken | H04L 29/06 709/203 |

(Continued)

OTHER PUBLICATIONS

Xu et al "Privacy-enhancing personalized web search" Proceedings of the 16th international conference on World Wide Web, 2007.

(Continued)

*Primary Examiner* — Krisna Lim
(74) *Attorney, Agent, or Firm* — Duft Bornsen & Fettig, LLP

(57) ABSTRACT

Systems and methods for preventing web services from using sensitive data in customizing web pages for a user. In one embodiment, a protection system is implemented between the user and the web service. The protection system identifies past interactions of the user with the web service, identifies text in the past interactions between the user and the web service, and identifies subjects discussed in the text. The protection system then communicates with the user to determine which of the subjects are sensitive to the user, and deletes a history stored by the web service for the user that relates to the sensitive subjects.

20 Claims, 4 Drawing Sheets

(56) References Cited

U.S. PATENT DOCUMENTS

| | | | |
|---|---|---|---|
| 2004/0098625 A1* | 5/2004 | Lagadec et al. | 713/201 |
| 2006/0005509 A1* | 1/2006 | Yohnke | E04B 1/762 52/782.1 |
| 2006/0101285 A1* | 5/2006 | Chen | G06F 21/602 713/193 |
| 2006/0212698 A1* | 9/2006 | Peckover | G06F 21/10 713/151 |
| 2007/0143851 A1* | 6/2007 | Nicodemus et al. | 726/25 |
| 2008/0127339 A1* | 5/2008 | Swain | H04L 12/585 726/22 |
| 2008/0216174 A1* | 9/2008 | Vogel et al. | 726/22 |
| 2009/0164400 A1* | 6/2009 | Amer-Yahia et al. | 706/45 |
| 2009/0198654 A1* | 8/2009 | Surendran et al. | 707/3 |
| 2010/0005509 A1* | 1/2010 | Peckover | 726/3 |
| 2010/0011000 A1* | 1/2010 | Chakra et al. | 707/9 |
| 2010/0106645 A1* | 4/2010 | Peckover | 705/50 |
| 2010/0107220 A1* | 4/2010 | Nguyen | 726/3 |
| 2010/0125544 A1* | 5/2010 | Lee et al. | 706/54 |
| 2010/0145951 A1* | 6/2010 | Van Coeverden De Groot | H04L 12/585 707/747 |
| 2010/0191582 A1* | 7/2010 | Dicker et al. | 705/10 |
| 2011/0082825 A1* | 4/2011 | Sathish et al. | 706/46 |
| 2011/0107362 A1* | 5/2011 | Reilly et al. | 725/23 |
| 2011/0131664 A1* | 6/2011 | Jonsson | 726/28 |
| 2011/0173676 A1* | 7/2011 | Peckover | 726/3 |
| 2012/0240238 A1* | 9/2012 | Gates et al. | 726/26 |
| 2012/0316962 A1* | 12/2012 | Rathod | G06F 17/30861 705/14.54 |
| 2013/0046869 A1* | 2/2013 | Jenkins et al. | 709/223 |
| 2013/0097085 A1* | 4/2013 | Peckover | 705/50 |
| 2013/0266127 A1* | 10/2013 | Schachter et al. | 379/88.01 |

OTHER PUBLICATIONS

Zhu et al, "Anonymizing user profiles for personalized web search" Proceedings of the 19th international conference on World wide web 2010.

* cited by examiner

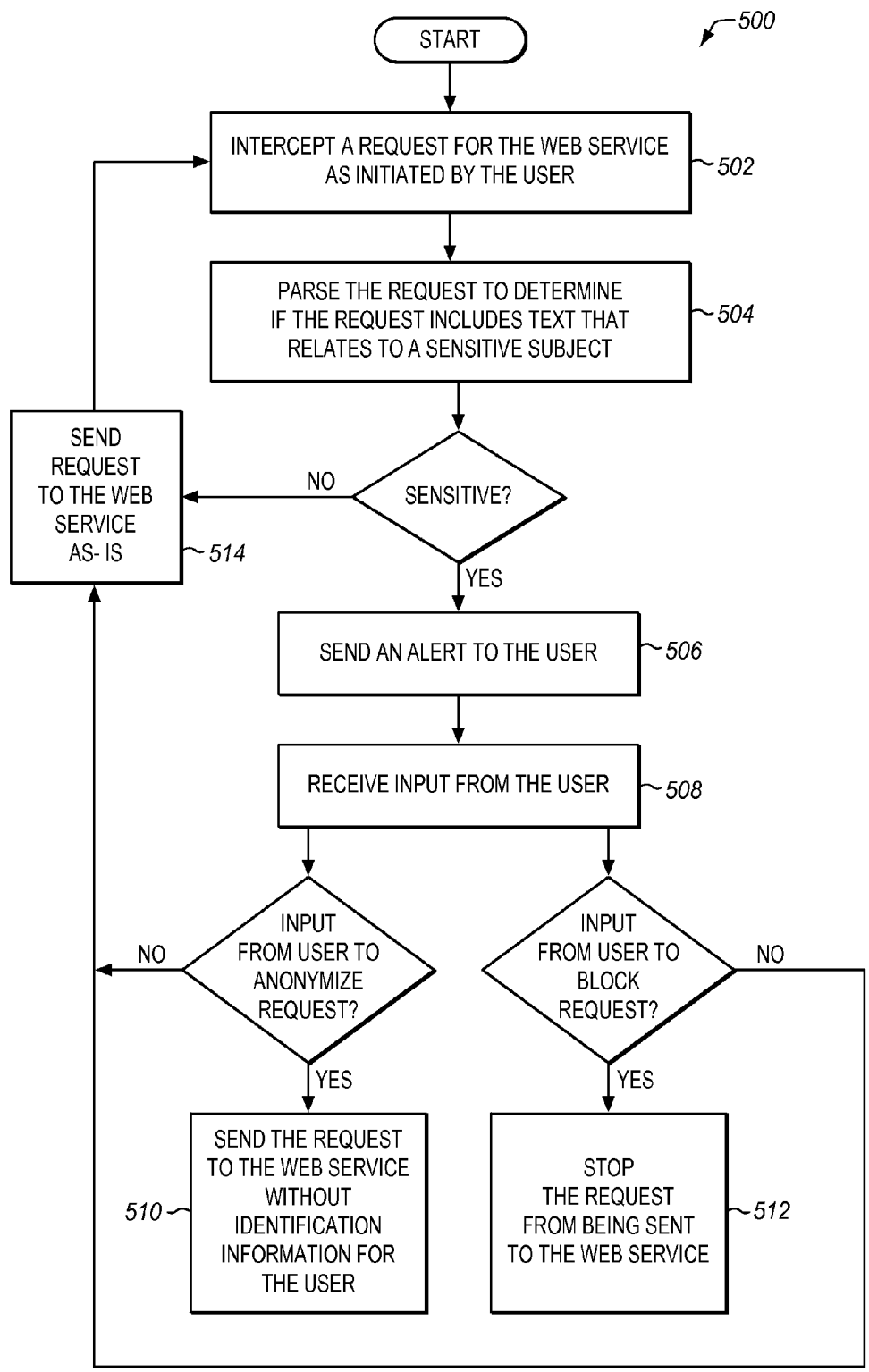

PROTECTION OF SENSITIVE DATA OF A USER FROM BEING UTILIZED BY WEB SERVICES

FIELD OF THE INVENTION

The invention is related to the field of communications and, in particular, to web services.

BACKGROUND

Web services (also referred to as online services) are becoming very popular as more and more web sites and applications are available to consumers. Some common types of web services are email, Instant Messaging (IM), blogs, internet search engines, social networking, etc. Because of the popularity of web services, service providers are continually looking for ways to improve the quality of the web services from the point of view of the consumer. One way to improve the quality of web services is to personalize the experience of the consumer. A web service can personalize the experience of a consumer by customizing web pages that are displayed to the consumer. The web service can customize content on the web page, the layout of the web page, external links displayed on the web page, advertisements, etc. To customize the web pages, the web service builds a profile for the consumer by collecting historical data for the consumer's prior usage of the web service. The historical data may be prior search queries, links selected, time spent on a particular web page, etc. For example, if a consumer surfs the internet using a search engine such as Google search, then the search engine (e.g., Google) may build a profile for the consumer that indicates the prior searches performed by the consumer.

Unfortunately, a consumer may not have control over what data is utilized by the web service when generating customized web pages. Some data may be sensitive to the consumer, and he/she may not want web pages customized using sensitive data. For example, if a consumer searches the internet for information about a disease, the consumer may not want the search engine to display advertisements related to the disease each time the consumer performs a search. Thus, consumers may want more control over what data a web service is able to use to personalize the consumer's experience.

SUMMARY

Embodiments described herein prevent web services from customizing web pages for a user based on subjects that may be sensitive to the user. The systems described herein, for example, monitor past and real-time interactions (e.g., emails, search queries, search results, web pages visited, etc) of a user with web services, and determines if some of the interactions relate to sensitive subjects. If so, the systems are able to selectively delete a past history of the user from the web service, and prevent sensitive data from being shared with the web service on future interactions. This advantageously allows the user more control over what types of potentially sensitive data is being used by a web service when personalizing a web page for the user.

Some web services provide tools where a user may change settings or preferences to completely stop personalization of web pages. This essentially makes the user autonomous to the web service. However, autonomous web services are not as useful as personalized web services, and disabling all personalization can severely affect the quality of the service. Some web services also provide tools for deleting or changing specific information in a user's profile. Although the user has fine-grained control over the data available to the web service, it is impractical for the user to repeatedly parse through vast amounts data to determine what may be sensitive and what should be changed.

The systems described herein are implemented between the user and the web service. Therefore, the systems can automatically monitor the interactions between the user and the web service, and identify if potentially sensitive subjects are involved in the interactions. If so, the systems can automatically prevent the web service from customizing web pages based on the sensitive subjects. Thus, the user can still receive customized web pages that relate to other subjects that are not sensitive, such as news, weather, sports, etc., but don't need to worry about a customized web page that may be embarrassing. Also, the systems described herein can be used with different types of web services, such as search engines, social networking sites, email, etc. Thus, a user does not need to figure out how to disable personalization features in many different types of web services.

In one embodiment, a protection system is implemented between a user and a web service. The protection system is configured to identify past interactions of the user with the web service, to identify text in the past interactions between the user and the web service, and to identify subjects discussed in the text. The protection system is further configured to communicate with the user to determine which of the subjects are sensitive to the user, and to delete a history stored by the web service for the user that relates to the sensitive subjects.

In another embodiment, the protection system is further configured to query the web service for the past interactions between the user and the web service.

In another embodiment, the protection system is further configured to monitor real-time interactions between the user and the web service over time.

In another embodiment, the protection system is further configured to query a device of the user for cookies stored by the device.

In another embodiment, the protection system is further configured to assign sensitive scores to the subjects, and display the sensitivity scores for the subjects to the user.

In another embodiment, the protection system is further configured to receive input from the user on the sensitivity scores, and to adjust the sensitivity scores for the subjects based on the input from the user.

In another embodiment, the protection system is further configured to intercept a request for the web service as initiated by the user, to parse the request to determine if the request includes text that relates to a sensitive subject, and to send an alert to the user that includes at least one option for handling the request.

In another embodiment, the protection system is further configured to anonymize the request before sending the request to the web service in response to input from the user.

In another embodiment, the protection system is further configured to block the request from being sent to the web service in response to input from the user.

Another embodiment comprises a method of preventing a web service from customizing web pages for a user based on sensitive subjects. The method includes identifying past interactions of a user with a web service, identifying text in the past interactions between the user and the web service, and identifying subjects discussed in the text. The method further includes communicating with the user to determine which of the subjects are sensitive to the user, and deleting a history stored by the web service for the user that relates to the sensitive subjects.

In another embodiment, the method step of identifying past interactions of a user with a web service comprises querying the web service for the past interactions between the user and the web service.

In another embodiment, the method step of identifying past interactions of a user with a web service comprises monitoring real-time interactions between the user and the web service over time.

In another embodiment, the method step of identifying past interactions of a user with a web service comprises querying a device of the user for cookies stored by the device.

In another embodiment, the method further comprises assigning sensitive scores to the subjects, and displaying the sensitivity scores for the subjects to the user.

In another embodiment, the method further comprises receiving input from the user on the sensitivity scores, and adjusting the sensitivity scores for the subjects based on the input from the user.

In another embodiment, the method further comprises intercepting a request for the web service as initiated by the user, parsing the request to determine if the request includes text that relates to a sensitive subject, and sending an alert to the user that includes at least one option for handling the request.

In another embodiment, the method further comprises anonymizing the request before sending the request to the web service in response to input from the user.

In another embodiment, the method further comprises blocking the request from being sent to the web service in response to input from the user.

Another embodiment includes a non-transitory computer readable medium that stores instructions that when executed by a computing system, causes the computing system to perform a method of identifying past interactions of a user with a web service, identifying text in the past interactions between the user and the web service, and identifying subjects discussed in the text. The method further includes communicating with the user to determine which of the subjects are sensitive to the user, and deleting a history stored by the web service for the user that relates to the sensitive subjects.

In another embodiment, the method further comprises intercepting a request for the web service as initiated by the user, parsing the request to determine if the request includes text that relates to a sensitive subject, and sending an alert to the user that includes at least one option for handling the request.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 5 is a flow chart illustrating a method of protecting real-time requests from a user to a web service in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
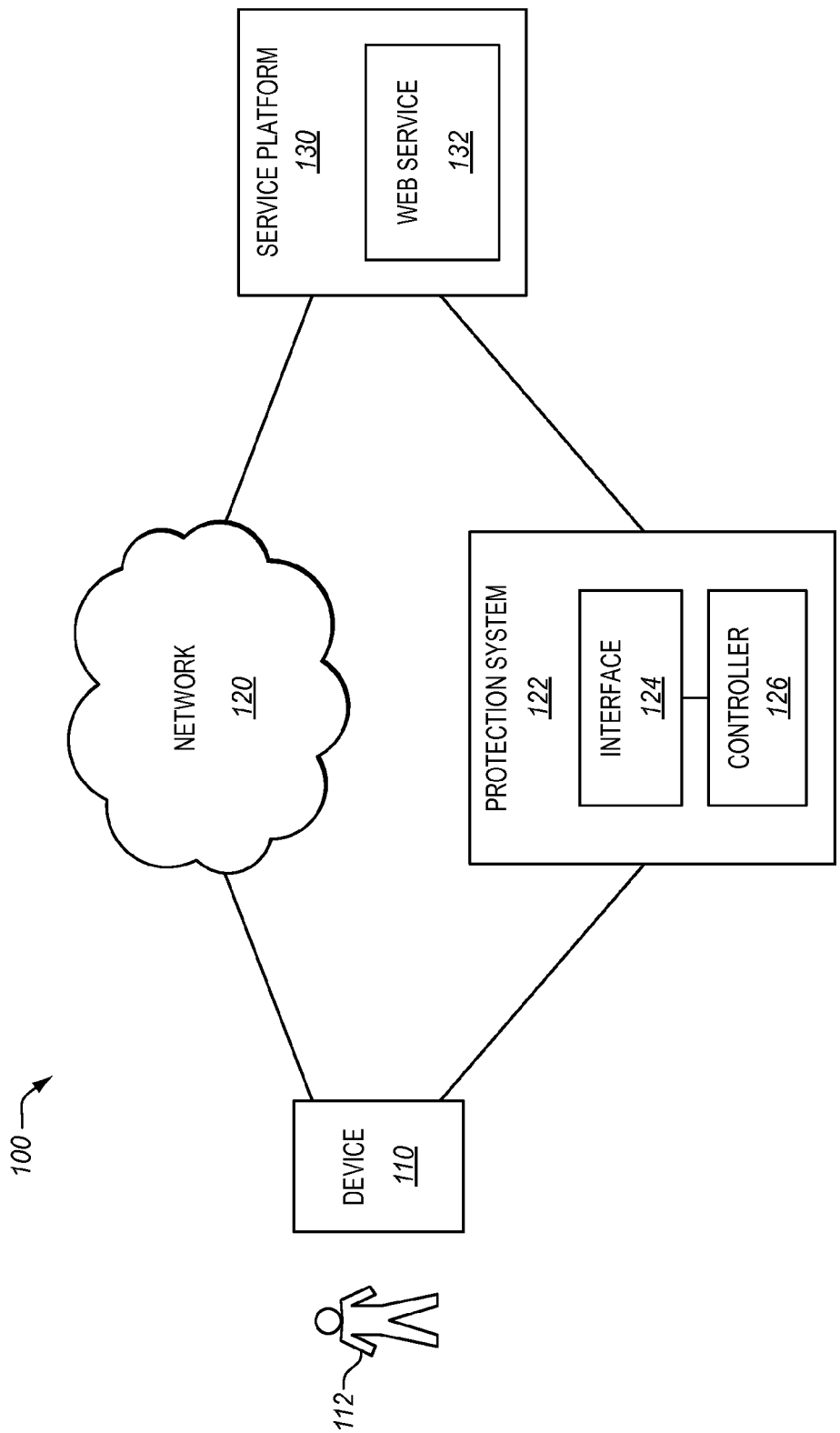
FIG. 1 illustrates a communication system in an exemplary embodiment.

FIG. 1 illustrates a communication system 100 in an exemplary embodiment. Communication system 100 includes an end user device 110 that is able to access one or more web services. Some examples of device 110 are a PC, a laptop, a phone, etc. The term "web services" is used herein to refer to services that are provided over a network, such as the internet, and that store a history for a user in order to customize web pages for the user. Web services may also be referred to herein as "online services". Device 110 is operated by a person that is referred to herein as a user 112. Device 110 is able to execute a dedicated application or browser-based application to access one or more web services over network 120. Network 120 comprises any type of communication network that allows a device to access a web service. Network may include an IP-based data network, such as the internet, an enterprise network, the World Wide Web, etc., and/or a Packet-Switched (PS) telecommunication (telecom) domain, such as an IP Multimedia Subsystem (IMS) network, a Long Term Evolution (LTE) network, etc. Those skilled in the art will appreciate that multiple elements, servers, or routers (not shown) of network 120 may commit resources to provide a device access to a web service.

FIG. 1 further shows that the web service is provided by a service platform 130. Service platform 130 may include one or more servers that provide a web service 132. For example, service platform 130 may represent one or more servers that provide an internet search engine. In some embodiments, an open Application Programming Interface (API) may be implemented between device 110 and service platform 130. The open API allows device 110 to issue requests to service platform 130 using standardized or generic commands. For example, the requests from device 110 may be formatted according to RESTful, SOAP, Parlay X, etc. Service platform 130, or an intermediate gateway (not shown), may be able to convert the requests from the API into a protocol used for the web service.

In the following embodiments, a protection system 122 is implemented between user 112 and web service 132. Protection system 122 provides a tool that is able to control what information or data the web service 132 is allowed to use to provide customized web pages for user 112. Protection system 122 may be implemented in any data path between the user's device 110 and web service 132. For instance, protection system 122 may be implemented in device 110, such as an application or a browser plugin. Protection system 122 may alternatively be implemented in network 120, such as a proxy server. There are many locations between user 112 and web service 132 where protection system 122 may be implemented, as long as protection system 122 is able to access data that is exchanged between the user's device 110 and web service 132. As an example, protection system 122 may sit in an internet path between user 112 and web service 132 so that protection system 122 can intercept search requests from device 110 (such as for a web search), intercept search results returned to device 110 from web service 132, etc.

Because protection system 122 can control what data is used by web service 132, protection system 122 is able to stop or inhibit web service 132 from using data that relates to a potentially sensitive subject. For instance, if user 112 were to perform an internet search on the subject of a particular disease, user 112 may not want web service 132 to customize web pages in the future with advertisements related to the disease. In this embodiment, protection system 122 includes an interface 124 and a controller 126. Interface 124 comprises any component or element operable to communicate with user's device 110, and to communicate with web service 132. Controller 126 comprises any component or element operable to process or parse communications exchanged between the user's device 110 and web service 132, and to control which the data web service 132 is allowed to use in customizing web pages. By controlling the data that web service 132 is allowed to use, protection system 122 can prevent web service 132 from customizing web pages for user 112 based on potentially sensitive subjects. An exemplary operation of protection system 122 is illustrated in FIG. 2

Figure 2:
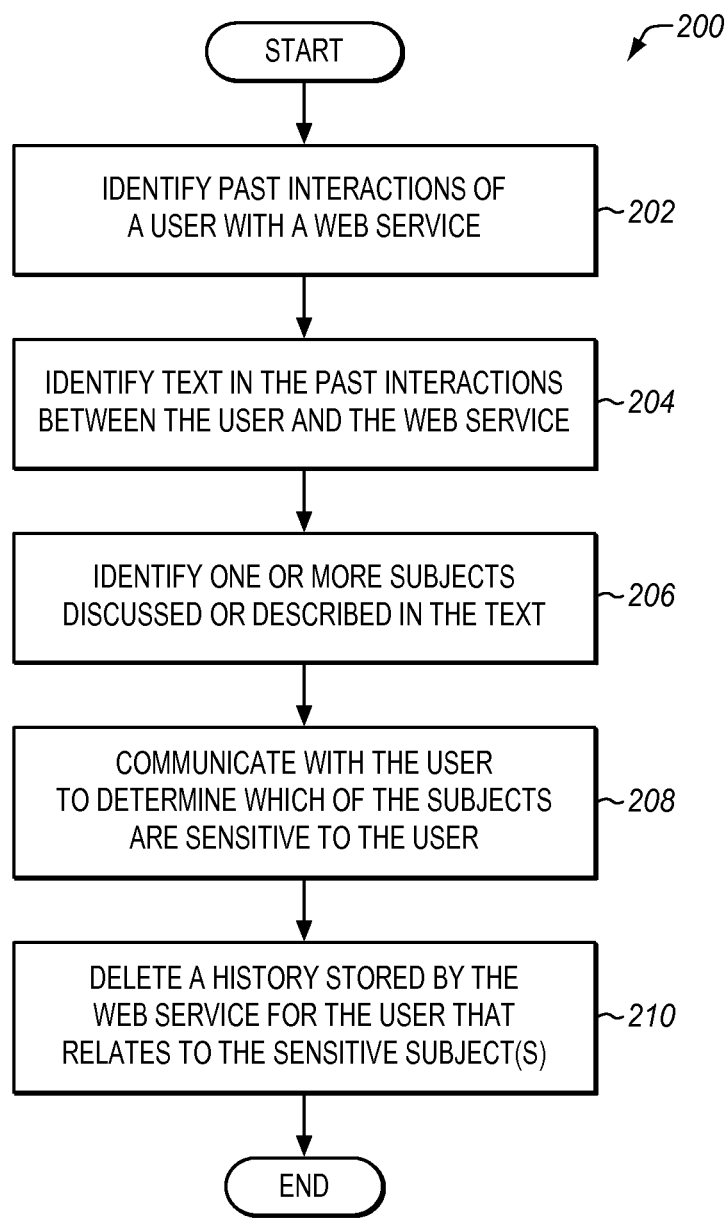
FIG. 2 is a flow chart illustrating a method of preventing a web service from customizing web pages for a user based on sensitive subjects in an exemplary embodiment.

FIG. 2 is a flow chart illustrating a method 200 of preventing web service 132 from customizing web pages for user 112 based on sensitive subjects in an exemplary embodiment. The steps of method 200 will be described with reference to protection system 122 in FIG. 1, but those skilled in the art will appreciate that methods described herein may be performed in other systems. The steps of the flow charts described herein are not all inclusive and may include other steps not shown. The steps may also be performed in an alternative order.

In step 202, controller 126 identifies past interactions of user 112 with web service 132. An interaction comprises a communication from a user to a web service, and possibly a response provided by the web service to the user. The following gives some examples of interactions with web services. For a search engine (e.g., Google, Yahoo, Bing, etc.), interactions include a user's past queries, results clicked, etc. For social networking websites (e.g., Facebook, Twitter, etc.), interactions include social interactions of the users, such as status updates, wall posts, comments, Instant Messages (IM), etc. For email providers, interactions include emails, replies, importance flags, tags/folders, chat history, etc. For online storage providers, interactions include the documents uploaded by the user, read/writes, etc.

To identify the past interactions of user 112, controller 126 may query web service 132 to extract a history for user 112 that is maintained by web service 132. The user history may include a search history of past queries made to web service 132 by user 112, links browsed by user 112 when accessing web service 132, etc. Controller 126 may also monitor the user's real-time requests to web service 132 over time, and monitor the responses provided by the web service 132. Controller 126 can then build a history for user 112 based on the real-time interactions. Controller 126 may also contact other sources to obtain a history for user 112 by querying device 110 (e.g., for cookies stored by device 110), by querying other web services, by searching documents on a disk, etc. Based the interactions between user 112 and web service 132, controller 126 is able to build a profile for user 112 that shows a history of user 112 accessing web service 132. Protection system 122 may first ask user 112 for permission to access information on the user's history, such as by providing a login or another type of authentication mechanism.

In step 204, controller 126 identifies text in the past interactions between user 112 and web service 132. One assumption is that the interactions include some type of textual information that is exchanged. As an example, for a search query, controller 126 may extract terms (words) from a search request, and extract text from the results (links, snippets) of the search request as provided by web service 132. For a web page, controller 126 may extract text from the title and body of the web page. For an email or IM message, controller 126 may extract text from the subject and/or body. Controller 126 is able to parse any desired portion of an "interaction" to extract text.

After extracting text from the past interactions, controller 126 identifies one or more subjects discussed or described in the text in step 206. In other words, controller 126 may categorize the text found in the past interactions it into different subjects or topics. The subjects could be from an identifiable topic such as "medical", "health", "financial", "sports", "weather", "news", etc., or could be built automatically by extracting frequent words, such as "Friends TV series", "Alcatel-Lucent", etc. A subject as described herein may include a name, such as "medical", and one or more terms that relate to the subject, such as "doctor", "hospital", "disease", etc. In addition to identifying the subjects found in the text, controller 126 may assign a sensitivity score to each of the subjects. Controller 126 may use information learned from user 112 (and global information from other users) to find words or terms that are considered sensitive topics. Controller 126 can then assign a sensitivity score to the subjects that are considered sensitive.

Figure 3:
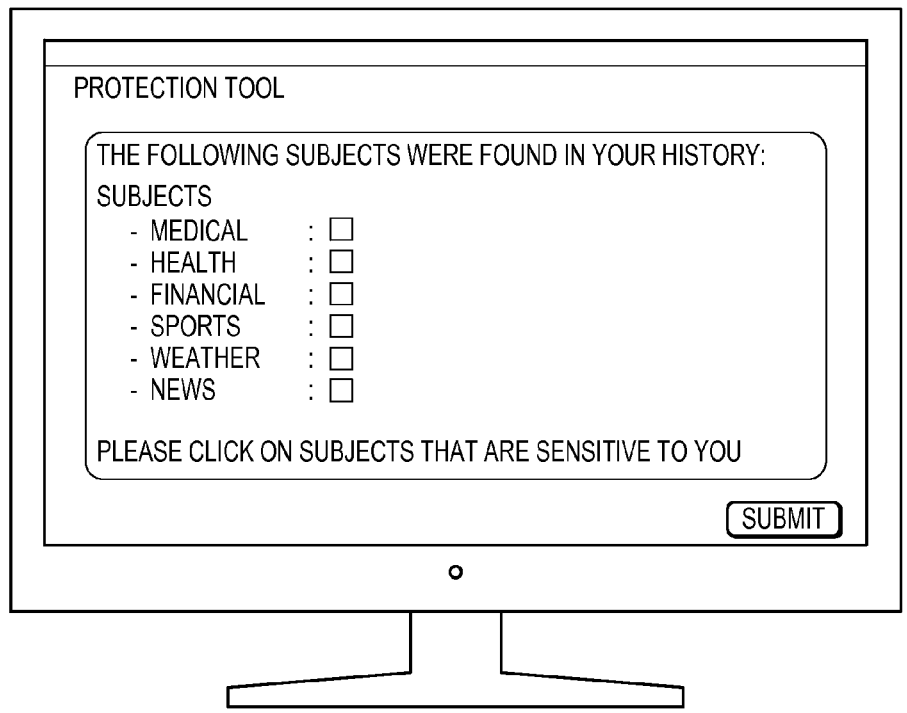
FIG. 3 illustrates an exemplary display provided to a user by a protection system in an exemplary embodiment.

In step 208, controller 126 communicates with user 112 through interface 124 to determine which of the subjects are sensitive to user 112. Interface 124 may display the subjects to user 112 (such as through device 110), and user 112 may provide input or feedback to controller 126 as to which of the subjects are sensitive to user 112. FIG. 3 illustrates an exemplary display provided to user 112 by protection system 122 in an exemplary embodiment. In FIG. 3, interface 124 provides a display to user 112 having the following subjects: "medical", "health", "financial", "sports", "weather", and "news". User 112 may then decide which of these subjects are sensitive, and provide input to protection system 122.

Figure 4:
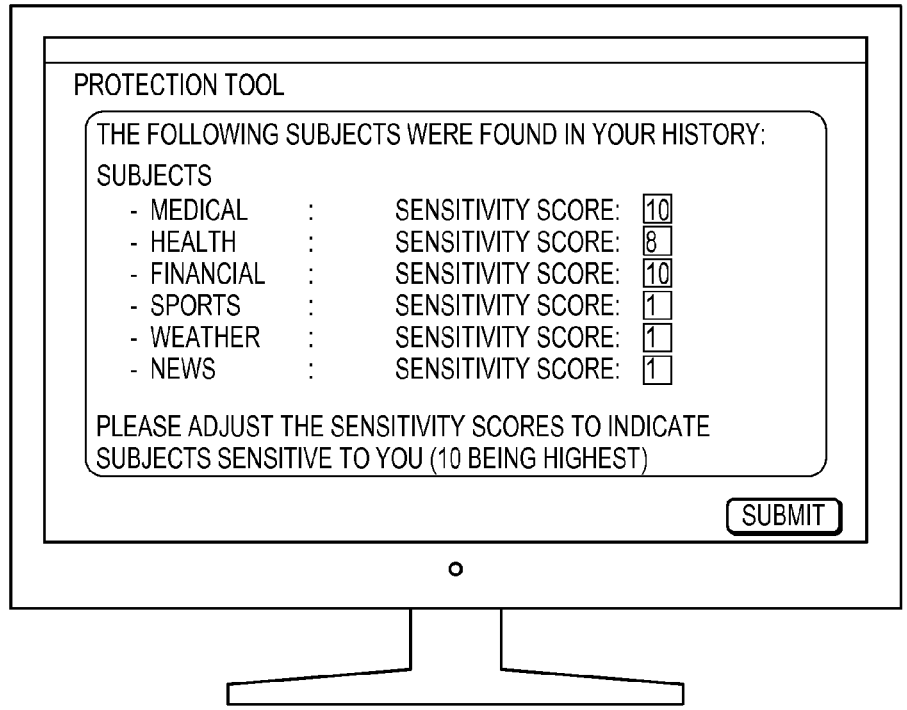
FIG. 4 illustrates another exemplary display provided to a user by a protection system in an exemplary embodiment.

In one embodiment, interface 124 may also display the sensitivity scores to user 112 that are assigned to each subject by protection system 122. FIG. 4 illustrates another exemplary display provided to user 112 by protection system 122 in an exemplary embodiment. In FIG. 4, interface 124 displays the same subjects to user 112 as in FIG. 3, but also displays a sensitivity score assigned to each subject. User 112 may decide which of these subjects are sensitive, and adjust the sensitivity scores for each subject. User 112 may also manually create one or more subjects, and assign a sensitivity score to them. Protection system 122 will treat the manual categories similar to the categories automatically created by protection system 122 based on the user's history.

Controller 126 then receives the input from user 112 through interface 124. At this point, protection system 122 has identified one or more subjects that are considered sensitive to user 112. In step 210, controller 126 deletes a history that is stored by web service 132 for user 112 that relates to the sensitive subject(s). For instance, controller 126 may interact with the web service APIs and delete each query made to web service 132 by user 112, each link browsed by user 122 when accessing web service 132, or any other data from the user's history that relates to a sensitive subject. By deleting the history for user 112, web service 132 will not be able to customize web pages for user 112 based on sensitive information. For example, if user 112 previously used a search engine to search for a cure for baldness, the search engine will not customize web pages for user 112 with hair growth products the next time the search engine is used.

For the operation of protection system 122 discussed above, protection system 122 is able to delete a history of user 112 from web service 132 that relates to a sensitive subject. Protection system 122 is also able to monitor real-time interactions of user 112 with web service 132 to protect future interactions.

FIG. 5 is a flow chart illustrating a method 500 of protecting real-time requests from a user to a web service in an exemplary embodiment. The steps of method 500 will be described with reference to protection system 122 in FIG. 1, but those skilled in the art will appreciate that methods described herein may be performed in other systems.

One assumption for method 500 is that protection system 122 stores a profile for user 112 that indicates one or more subjects that are sensitive to user 112. The profile for user 112 may also indicate a sensitivity score for each of the subjects. With the profile being stored in protection system 122, user 112 sends a request to web service 132 (through device 110). For example, if web service 132 is a search engine, then the request may be a search request with one or more search terms.

According to method 500, interface 124 of protection system 122 intercepts the requests for web service 132 as initiated by user 112 in step 502. Controller 126 then parses the request (or a response to the request) to determine if the request includes text that relates to a sensitive subject in step 504. If the request does not include text that relates to a sensitive subject, then controller 126 sends the request to web service 132 as-is in step 514. If the request includes text that relates to a sensitive subject, then controller 126 sends an alert to user 122 in step 506. The alert indicates that the request from user 112 relates to a sensitive subject. The alert from protection system 122 may also include one or more options for handling the request. One option is to make the request anonymous before the request is sent to web service 132. Another option is to block the request from web service 132.

In response to the alert sent to user 112, interface 124 receives input or feedback from user 122 in step 508. If the input from user 112 is to make the request anonymous, then controller 126 sends the request to web service 132 without identification information for user 112 in step 510. For example, controller 126 may remove all cookies that identify user 112 or the current session from the request before sending to web service 132. Controller 126 may alternatively send the request to web service 132 through an IP-anonymizer so that web service 132 is not able to track the IP address of user 112. Step 510 may also be referred to as "anonymizing" the request before it is sent to web service 132. If the input from user 112 is not to make the request anonymous, then controller 126 sends the request to web service 132 as-is in step 514.

If the input from user 112 is to block the request, then controller 126 stops the request from being sent to web service 132 in step 512, and deletes the request. If the input from user 112 is not to block the request, then controller 126 sends the request to web service 132 as-is in step 514.

Once a term or subject is determined to be sensitive to user 112, controller 126 may determine whether or not to anonymize requests without asking user 112.

Based on method 500, requests that contain sensitive information are either sent anonymously to web service 132 or are not sent at all. That way, web service 132 cannot build a history for user 112 that includes sensitive information. If web service 132 does not have a history for user 112 that includes sensitive information, then web service 132 advantageously cannot customize web pages for user 112 based on sensitive information. Therefore, user 112 will have a more pleasant experience with web service 132.

The following illustrates an example of how protection system 122 may identify subjects discussed in the text of the past interactions between user 112 and web service 132. For this algorithm, any interaction between user 112 and web service 132 is referred to as an "entity", and the subjects found in the text are referred to as "clusters" of text. For this algorithm, the inputs are entities (E1 . . . En). The algorithm then works as follows:

1. Put each entity in a separate cluster.
2. Pick the pair of clusters Ci and Cj with max similarity (ClusterSim(Ci, Cj)).
3. If ClusterSim(Ci, Cj)<cluster_threshold, then stop.
4. If ClusterSim(Ci, Cj)>=cluster_threshold, then merge Ci and Cj into a single cluster and repeat.

The following illustrates the ClusterSim Algorithm. The inputs for this algorithm are clusters C1 and C2. The algorithm then works as follows:

1. Extract the normalized word frequencies Wi(C1) and Wi(C2) for each word in each entity of C1 and C2.
2. Compute KL-Divergence:

$$KL(C1, C2) = \sum_{i=1}^{n} \left( W_i(C1) \ln \frac{wi(C1)}{wi(C2)} + W_i(C2) \ln \frac{wi(C2)}{wi(C1)} \right)$$

3. Return similarity as KL(C1, C2).

The following illustrates an exemplary algorithm for computing the sensitivity scores for a cluster. The input for this algorithm (SenseScore Algorithm) is cluster C which contains entities (E1 . . . En). The algorithm works as follows:

1. Compute sensitivity of word Wi as:

$$\text{sensitivity}(W_i) = \sum_c (W_i(C) SensitivityUser(C)) \Big/ \sum_c (W_i(C))$$

where SensitivityUser(C) is the sensitivity score allocated by the user to cluster C.

2. Compute sensitivity of cluster C as:

sensitivity(C)=$\Sigma_{i=1}^n (W_i(C)\text{sensitivity}(W_i))$

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An apparatus comprising:
   a protection system comprising a hardware controller implemented in a network in a data path between a device of a user and a web server that provides a web service;
   the hardware controller intercepts communications exchanged between the user and the web service over the network, identifies text in the communications between the user and the web service, and identifies subjects discussed in the text;
   the controller communicates with the device to display the subjects to the user and determine which of the subjects are sensitive to the user, and interacts with the web server over the network to delete a history for the user from the web server that relates to the sensitive subjects.

2. The apparatus of claim 1 wherein:
   the protection system further includes an interface; and
   the hardware controller queries the web service through the interface for past communications between the user and the web service.

3. The apparatus of claim 2 wherein:
   the past communications comprise past queries to a search engine.

4. The apparatus of claim 1 wherein:
   the protection system further includes an interface; and
   the hardware controller queries the device of the user through the interface for cookies stored by the device.

5. The apparatus of claim 1 wherein:
   the hardware controller assigns sensitivity scores to the subjects, and displays the sensitivity scores for the subjects to the user.

6. The apparatus of claim 5 wherein:
   the hardware controller receives input from the user on the sensitivity scores through an interface, and adjusts the sensitivity scores for the subjects based on the input from the user.

7. The apparatus of claim 1 wherein:
   the hardware controller intercepts a request for the web service as initiated by the user, parses the request to determine if the request includes text that relates to a sensitive subject, and sends an alert to the user that includes at least one option for handling the request.

8. The apparatus of claim 7 wherein:
   the hardware controller makes the request anonymous before sending the request to the web service in response to input from the user.

9. The apparatus of claim 7 wherein:
   the hardware controller blocks the request from being sent to the web service in response to input from the user.

10. A method operable in a protection system comprising a hardware controller that is implemented in a network in a data path between a device of a user and a web server that provides a web service, the method comprising:
    intercepting, by the hardware controller of the protection system, communications exchanged between the user and the web service over the network;
    identifying, by the hardware controller, text in the communications between the user and the web service;
    identifying, by the hardware controller, subjects discussed in the text;
    communicating, by the hardware controller, with the device to display the subjects to the user and determine which of the subjects are sensitive to the user; and
    interacting, by the hardware controller, with the web server over the network to delete a history for the user from the web server that relates to the sensitive subjects.

11. The method of claim 10 further comprising:
    querying the web service for past communications between the user and the web service.

12. The method of claim 11 wherein querying the web service for past communications comprises:
    querying the web service for past queries to a search engine.

13. The method of claim 10 further comprising:
    querying the device of the user for cookies stored by the device.

14. The method of claim 10 further comprising:
    assigning sensitivity scores to the subjects; and
    displaying the sensitivity scores for the subjects to the user.

15. The method of claim 14 further comprising:
    receiving input from the user on the sensitivity scores; and
    adjusting the sensitivity scores for the subjects based on the input from the user.

16. The method of claim 10 further comprising:
    intercepting a request for the web service as initiated by the user;
    parsing the request to determine if the request includes text that relates to a sensitive subject; and
    sending an alert to the user that includes at least one option for handling the request.

17. The method of claim 16 further comprising:
    anonymizing the request before sending the request to the web service in response to input from the user.

18. The method of claim 16 further comprising:
    blocking the request from being sent to the web service in response to input from the user.

19. A non-transitory computer readable medium that stores instructions that, when executed by a computing system, causes the computing system to perform a method of:
    intercepting, by a hardware controller of a protection system, communications exchanged between a user and a web service over a network, wherein the hardware controller is implemented in a network in a data path between a device of the user and a web server that provides the web service;

identifying, by the hardware controller, text in the communications between the user and the web service;

identifying, by the hardware controller, subjects discussed in the text;

communicating, by the hardware controller, with the device to display the subjects to the user and determine which of the subjects are sensitive to the user; and interacting, by the hardware controller, with the web server over the network to delete a history for the user from the web server that relates to the sensitive subjects.

20. The computer readable medium of claim 19, wherein the method further comprises:

intercepting a request for the web service as initiated by the user;

parsing the request to determine if the request includes text that relates to a sensitive subject; and sending an alert to the user that includes at least one option for handling the request.

\* \* \* \* \*